July 6, 1937.　　　R. N. FALGE ET AL　　　2,086,356
METHOD OF MAKING REFLECTOR SIGNALS
Original Filed March 31, 1932　　3 Sheets-Sheet 1

Inventors
Robert N. Falge,
Charles E. Godley, &
John H. Little.
By Blackmore, Spencer & Flint
Attorneys July 6, 1937.    R. N. FALGE ET AL    2,086,356
METHOD OF MAKING REFLECTOR SIGNALS
Original Filed March 31, 1932    3 Sheets-Sheet 2

Inventors
Robert N. Falge,
Charles E. Godley, &
John H. Little.
By Blackmore, Spencer & Flint
Attorneys July 6, 1937.  R. N. FALGE ET AL  2,086,356
METHOD OF MAKING REFLECTOR SIGNALS
Original Filed March 31, 1932   3 Sheets-Sheet 3

Inventors
Robert N. Falge,
Charles E. Godley &
John H. Little.
By Blackmore, Spencer & Flint
Attorneys Patented July 6, 1937

2,086,356

UNITED STATES PATENT OFFICE 2,086,356

METHOD OF MAKING REFLECTOR SIGNALS

Robert N. Falge, Anderson, Ind., and Charles E. Godley, Ypsilanti, and John H. Little, Detroit, Mich., assignors to General Motors Corporation, Detroit, Mich., a corporation of Delaware Substitute for application Serial No. 602,220, March 31, 1932. This application August 14, 1935, Serial No. 36,180

3 Claims. (Cl. 49—85)

This application was formerly filed under S. N. 602,220 on March 31, 1932, said application having since become abandoned.

This invention has to do with a method of making molded reflector signals such as the molded glass signals known as Stimsonite, and is an improvement on the method described and claimed in the prior patent to Stimson, 1,591,572, granted July 6, 1926. According to the method disclosed in that patent each of the three faces forming a central triple reflector is formed by a separate mold element, usually in the form of a bar. A number of properly formed bars are clamped together to form the assembled mold, and this mold is impressed upon the glass or other transparent material from which the signal is to be made. Each of the mold elements must be very accurately machined and assembled to maintain the proper relation between the three reflector faces. Slight inaccuracies in the individual surfaces and slight angular variations between the three surfaces which form each central triple reflector are sufficient to interfere seriously with the performance of the reflector.

According to our invention, each central triple reflector is formed from the three surfaces on a single matrix element. To accomplish this, and secure the proper relation of surfaces, it is necessary to perform an intermediate step. That step consists in making a mold element by imprinting the pattern of the matrix element in metal or other suitable material. It is from this mold that the reflector is produced.

Machining of the three surfaces of the central triple reflector upon one matrix element and then transferring them to the mold element not only insures greater accuracy in the positioning of the three reflector faces relative to one another but also permits the making up of many molds from a single relatively expensive matrix element. These molds may themselves be assembled in mosaic form to produce as large a composite pattern as may be desired. This greatly reduces the cost of upkeep of the molds which must be replaced from time to time, since the master die is not subject to the heat of the molten material and to consequent burning and pitting. The master die is obviously the more expensive because each of the die elements must be machined with very great precision.

In the drawings:

Figure 8 is a view of a modified form of matrix element, while

Figure 1:
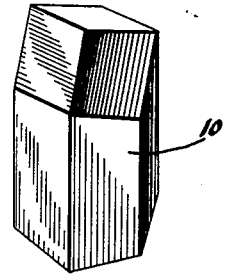
Figure 1 is a perspective view of a single matrix element.
Figure 2:
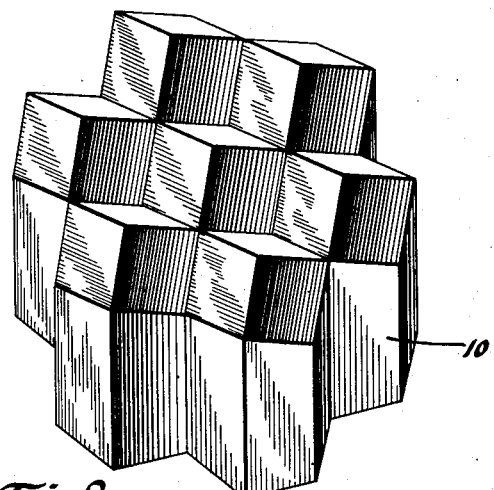
Figure 2 is a perspective view of a group of matrix elements in assembled relation.

A number of matrix elements 10 identical with that shown in Figure 1 are made up and these elements are assembled in nested relation as shown in Figure 2 with all cube corners similarly oriented for good appearance although this is not essential. The assembled matrix elements are then inserted in a suitable retainer, such as shown at 12 in Figure 3, upon a suitable block 14. Above the retainer is arranged a blank holder 16 having a blank receiving aperture 18 formed therein, said aperture being machined to accurately fit the assembled matrix elements, and being similarly grooved throughout its length. At 20 we have illustrated a blank, and above the blank is fitted the plunger 22. The plunger has the same cross section as the blank receiving aperture 18, but the blank 20 may be of cylindrical or any other desired form. It is, of course, of softer metal than the plunger 22, and the mold elements 10.

Upon applying heavy pressure to the plunger 22 the blank is forced to take the form of the aperture 18, and to receive on its lower face the impressions of the triple reflectors on the matrix elements. If desired, the die cavity 18 could be provided with a relief groove communicating with the exterior for the ejection of excess material, although we prefer a closed die to obtain greater accuracy in forming. The advantage of relief grooves is that articles may be formed at much lower pressures than would otherwise be required.

Figure 4:
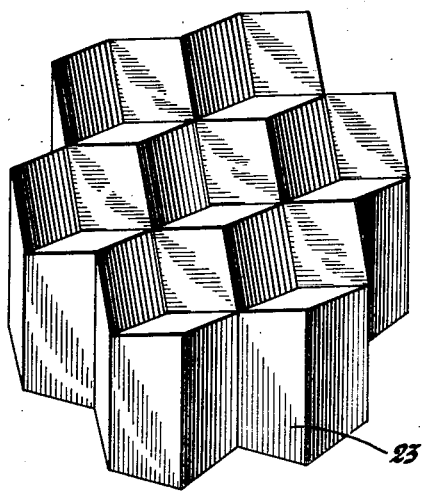
Figure 4 is a perspective view of a mold produced by the method shown in Figure 3.
Figure 3:
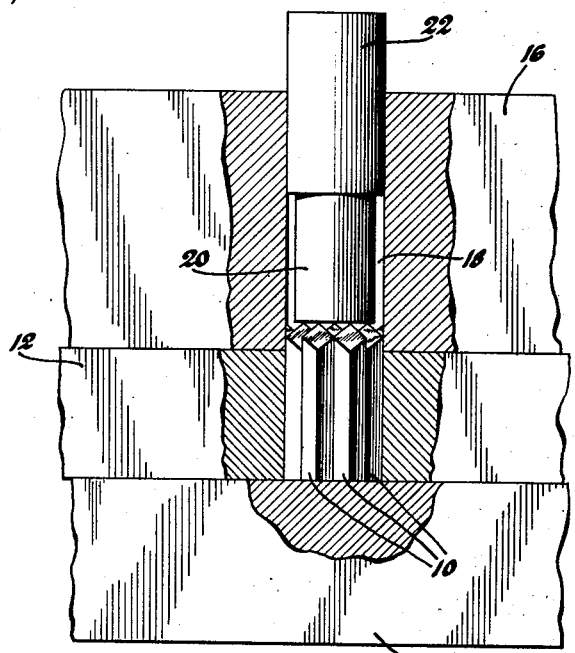
Figure 3 is a sectional view showing the method of producing the mold from the matrix elements.
Figure 5:
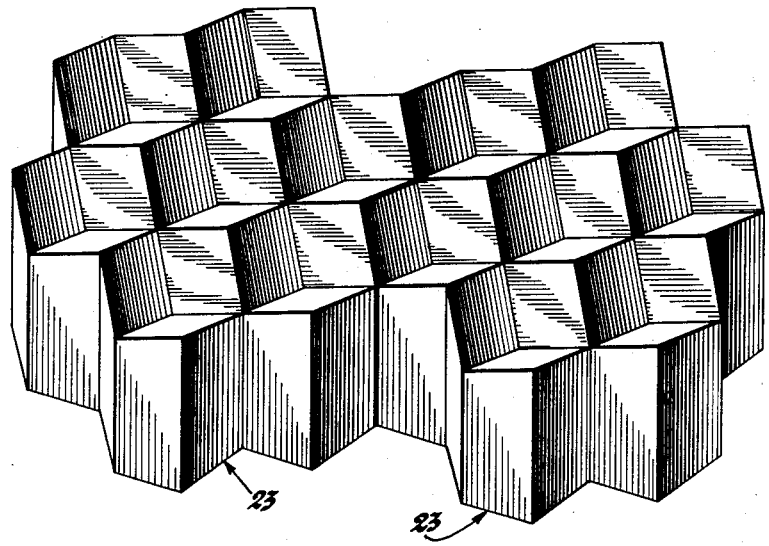
Figure 5 is a perspective view showing the way in which molds may be assembled where it is desired to imprint a larger pattern.

We have shown in Figure 4 a mold element 23 produced by the method shown in Figure 3. It will be noted that not only is the end of the blank accurately formed, but the sides are likewise accurately molded so that two or any number of the mold elements may be assembled after the manner shown in Figure 5. The junction of the elements is shown by the heavy black line in this figure.

Figure 6:
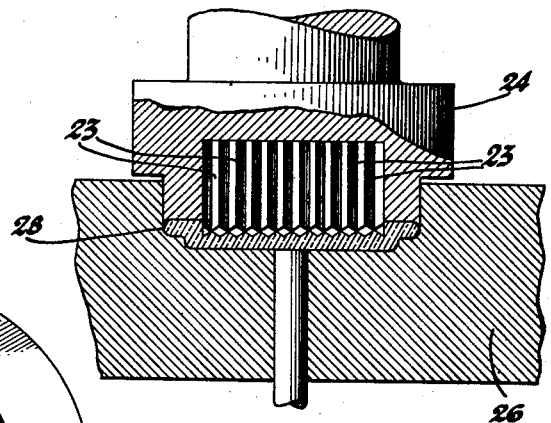
Figure 6 shows the method of using the molds in the manufacture of a lens.

We have shown in Figure 6 a number of mold elements assembled in a plunger 24, and impressing their form upon the glass blank, shown at 26. This blank is received in the mold cavity 28 which may be of any desired configuration.

Figure 7:
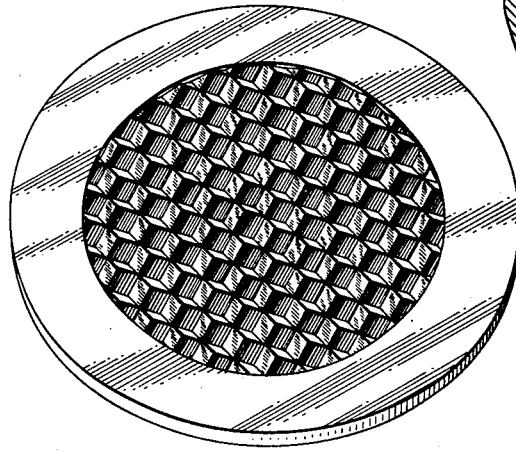
Figure 7 is a view showing a finished lens.

In Figure 7 we have indicated a finished lens. It will be noted that the nested mold elements have produced a pattern which likewise has the appearance of an uninterrupted series of corners of cubes with the apices directed away from the reader. This unit will be found very efficient as a reflector signal for automobile and road use.

Obviously the mold produced by our method may be used to impress patterns upon glass, pyralin, or any other plastic material. The lenses produced by our process are characterized by greater accuracy since each triple reflector is formed from a single matrix element. The molds may be renewed at slight expense since it is but necessary to form new mold elements from the master matrix. It will be obvious that our method is not limited to the employment of any particular number of triple reflectors in combination as this will depend upon the use to which the signal is put.

Figure 8:
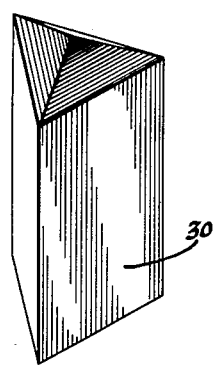
Figure 9:
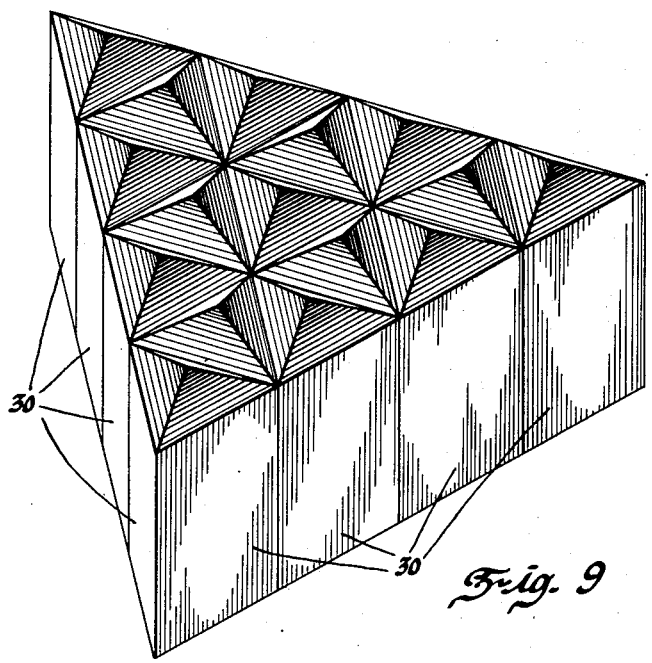
Figure 9 shows a group of such elements.

It is not essential that the matrix and mold elements be of hexagonal shape in cross section. Triangular elements will serve equally well except that the cube corners so formed will have triangular faces which are optically less efficient than the square faces obtained by using hexagonal bars. We have shown such an element at 30 in Figure 8, while Figure 9 shows an assembly of this type of matrix element. While it is possible to machine a die of the shape of Figure 9 from a solid block of metal, it is an advantage to use matrix elements in the form of bars because they can be machined and lapped individually, giving more accurate and better finished surfaces.

Figure 10:
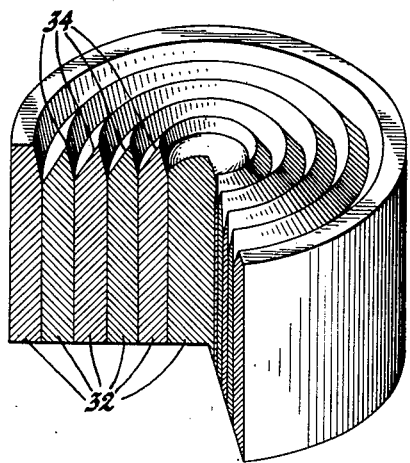
Figure 10 is a perspective view, partly in section, showing a matrix which may be used in applying our method to the manufacture of catadioptric lenses.

In Figure 10, we have shown a matrix for producing catadioptric lenses, such as are used in the tail lamps of automobiles. This matrix is made up of nested elements 32 in the form of concentric cylinders having their ends machined in the shape of circular prisms 34 so oriented that the assembly takes the form of a catadioptric condensing lens. While this matrix could be machined out of one piece, the lens rings can be much more accurately shaped and polished if they are made individually.

Figure 11:
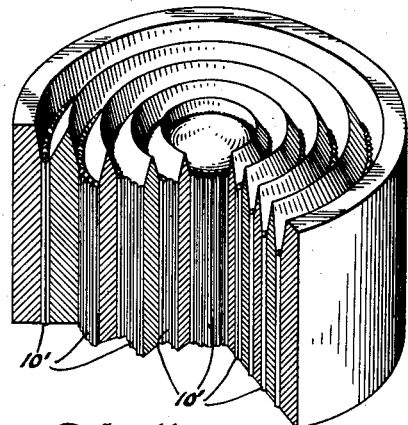
Figure 11 is a view corresponding to Figure 10, but showing the combination of catadioptric lens and reflex signal areas.

In Figure 11, we have shown a mold, like that of Figure 10, except that we have inserted between the rings matrix elements 10', like that shown in Figure 1. This matrix, like all others described, will be employed to make a metal mold element, and the mold element will be used to shape glass blanks, these operations being performed in the manner illustrated in Figures 3 and 6. The inserted matrix elements may be hexagonal, triangular, square, or any other shape to facilitate assembly, the concentric rings being profiled to permit them to nest properly. This example of the use of our invention is of particular interest because the shape disclosed could not be made by known methods.

We claim:

1. The method of making a reflector signal lens which consists in forming on each of a number of nestable matrix elements, mold-forming surfaces grouped about an axis, assembling a plurality of said elements in nested relation with their formed ends adjacent each other, making a reverse mold from said formed ends by causing said ends to make intimate contact with suitable material, and impressing the reverse mold upon transparent plastic material to produce upon the material a plurality of reflecting units, each of which has its cooperating faces formed from a portion of the reverse mold which was formed by one only of said matrix elements.

2. The method of making a central triple reflector lens which consists in preparing a plurality of nestable rods, forming one end of each of the rods to the shape of a congruent trihedral angle whose faces make angles of 90° with respect to each other, securing the rods together with their formed ends in adjacent relation, making a reverse mold from said formed ends by causing said ends to make intimate contact with suitable material, and impressing the reverse mold upon transparent plastic material to produce a molded reflector lens, each of the reflecting units of which has its faces formed from a portion of the reverse mold which was formed by one only of said rods.

3. The method of making a central triple reflector lens which consists in preparing a plurality of nestable rods, forming one end of each of the rods to the shape of a congruent trihedral angle whose faces make angles of 90° with respect to each other, securing the rods together with their formed ends adjacent each other, making a reverse mold from said formed ends by causing said ends to make intimate contact with suitable material, shaping the sides of the reverse mold to conform to the shape of the sides of the nested rods, assembling a plurality of the formed reverse molds in nested relation and impressing the composite mold upon plastic material to produce a molded reflector lens, each of the reflecting units of which has its face formed from a portion of the reverse mold which was formed by one only of said rods.

ROBERT N. FALGE.
CHARLES E. GODLEY.
JOHN H. LITTLE.